United States Patent [19]

Gauthier

[11] Patent Number: 4,626,011
[45] Date of Patent: Dec. 2, 1986

[54] BUMPER

[75] Inventor: Jeffry W. Gauthier, Oklahoma City, Okla.

[73] Assignee: Central Oklahoma Ambulance Trust, Okla.

[21] Appl. No.: 697,945

[22] Filed: Feb. 4, 1985

[51] Int. Cl.⁴ .............................................. B60R 19/02
[52] U.S. Cl. .................................... 293/120; 293/122; 293/136
[58] Field of Search .............. 293/102, 117, 112, 120, 293/131, 155, 154, 136, 122

[56] References Cited

U.S. PATENT DOCUMENTS

| 1,639,011 | 8/1927 | Taylor | 293/102 |
| 1,699,492 | 1/1929 | Nordgren | 293/155 |
| 4,027,909 | 6/1977 | Hauraux et al. | 293/136 |
| 4,487,446 | 12/1984 | Reich, II | 293/117 |

Primary Examiner—Robert R. Song
Attorney, Agent, or Firm—Dunlap, Codding & Peterson

[57] ABSTRACT

An improved bumper for a vehicle is comprised of a crossbar attachable to the frame of the vehicle and two tubular reinforcing sheaths mounted on end portions of the crossbar that extend laterally of the frame of the vehicle. Braces are connected between the sheaths and the frame of the vehicle and an elastomeric pad is mounted on each sheath at a position diametrically opposed to the attachment of a brace to the sheath.

3 Claims, 6 Drawing Figures

BUMPER

BACKGROUND OF THE INVENTION

1. Field of the Invention

The present invention relates generally to improvements in bumpers for automotive vehicles and, more particularly, but not by way of limitation, to improvements in bumpers for ambulances.

2. Brief Description of the Prior Art

It has become common practice in recent years to construct ambulances by mounting a patient compartment, constructed of sheet metal, on rear portions of the frame of a truck body with forward portions of the frame supporting the usual truck cab. As supplied by the manufacturer, the rear bumper of such an ambulance usually consists of little more than a crossbar, constructed of a length of rectangular tubing, that is welded in its medial portions to the frame of the truck body and has end portions that extend laterally from opposite sides of the frame.

It has been found in practice that such bumpers do not adequately protect the patient compartment from damage occasioned by rear-end collisions to which an ambulance might be subjected and, moreover, such bumpers can be subjected to damage through mishaps that occur in the normal usage of an ambulance. For example, the end portions of a length of rectangular tubing serving as a bumper extend in cantilever fashion from the frame of the ambulance so that a collision that occurs off center of the rear of the ambulance can bend the end portion of the bumper about the connection of the bumper to the ambulance frame with the result that the vehicle colliding with the ambulance can engage the patient compartment of the ambulance causing heavy damage to such compartment. Similarly, it may often be necessary for an ambulance to cross a medial strip in a freeway or highway so that the rectangular cross section of the rear bumper can result in snagging of the ends of the bumper with the ground or with obstructions in the medial strip of the freeway to occasion damage to the rear bumper. Because of these defects, high maintenance costs have been associated with the upkeep of ambulances provided with conventional bumpers.

While the maintenance costs associated with the upkeep of an ambulance can, to some extent, be reduced by attaching braces between the end portions of the conventional bumpers and the frame of the ambulance, it has been found that such braces do not really solve the problem. Tips of the end portions can still be bent to permit a second vehicle to collide with the patient compartment of the ambulance and the rectangular cross section of the conventional bumper, even with bracing, will still permit snagging of the bumper should the ambulance cross a medial strip of a freeway with the result that merely bracing the rear bumper of the ambulance has proven to be generally ineffective in providing a significant reduction of maintenance costs for the ambulance.

It is also known to weld a reinforcing member; for example, a length of oil field drill pipe, to the rear bumper of a commercial vehicle but such solution to the maintenance problems associated with ambulances is defective in several respects. In addition to providing the ambulance with an unsightly appearance, the cost of the drill pipe is by no means insignificant.

SUMMARY OF THE INVENTION

The present invention solves these and other problems via a novel bumper construction in which only selected portions of a bumper are reinforced. In particular, the bumper of the present invention is comprised of a crossbar, constructed in the manner of a conventional bumper, two tubular sheaths, constructed of drill pipe, that are mounted on end portions of the crossbar, and braces that are welded between the tubular sheaths and the frame of the vehicle. The braces prevent the end portions of the resulting bumper from pivoting about the connection of the crossbar to the vehicle frame and the sheaths provide such end portions of the bumper with a rigidity that prevents bending of the tips of the bumper so that a rear end collision with a vehicle provided with the bumper of the present invention will result in overall movement of such vehicle rather than a reconfiguration of the bumper that would permit contact, and damage, to portions of the vehicle, such as the patient compartment of an ambulance, that the bumper is designed to protect. Moreover, by reinforcing only portions of a conventional bumper, the reinforcement can be achieved at low cost in both materials and labor. That is, only small quantities of drill pipe are used in the construction of the reinforcement sheaths and such sheaths are easily mounted on the crossbar of the bumper by sliding the sheaths over the end portions of the crossbar and welding the sheaths to the crossbar. Additionally, because of the cylindrical outer surface of the sheaths, the bumper is less prone to snagging should the vehicle be driven across the medial strip of a freeway as may be necessary when the vehicle upon which the bumper of the present invention is mounted is an ambulance. That is, no purchase will exist between the tubular sheaths and an obstruction, or the ground, in the medial strip so that the sheaths tend to slide over an obstruction, or the ground, rather than becoming snagged with resultant damage to the bumper. An added benefit of mounting the sheaths over end portions of the crossbar is that the axial alignment of the sheaths and the crossbar provide the bumper with a pleasing appearance so that no loss of esthetic qualities of the bumper is occasioned by the reinforcement that the bumper of the present invention provides.

An object of the present invention is to provide a vehicle bumper having a rigidity in selected portions thereof necessary for the bumper to carry out its intended purpose while avoiding the expense of providing a bumper that is rigid throughout its length.

Another object of the present invention is to provide a vehicle bumper that is substantially maintenance free.

Yet another object of the present invention is to provide a bumper having a pleasing appearance without loss of the vehicle protection function for which the bumper is provided.

Other objects, advantages and features of the present invention will become clear from the following detailed description of the preferred embodiment of the invention when read in conjunction with the drawings and appended claims.

DESCRIPTION OF FIGS. 1-4

Figure 1:
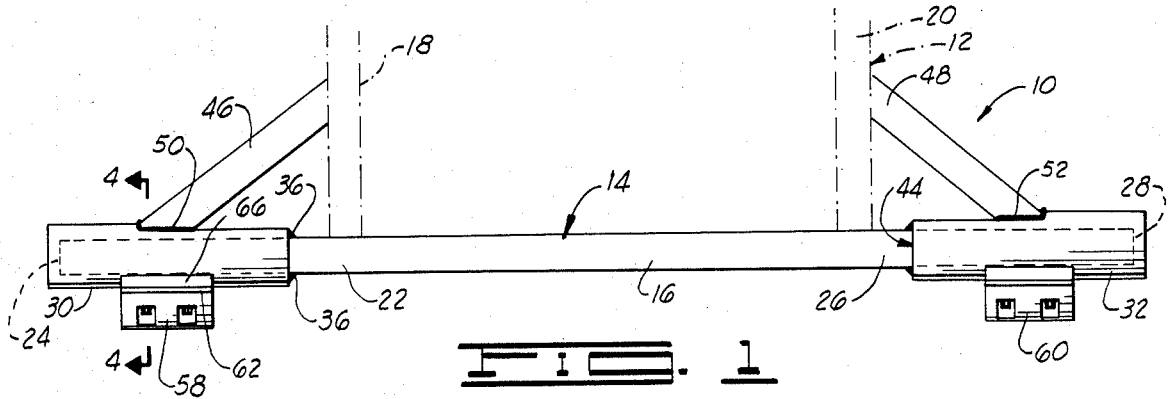
FIG. 1 is a plan view of an improved bumper constructed in accordance with the present invention.
Figure 2:
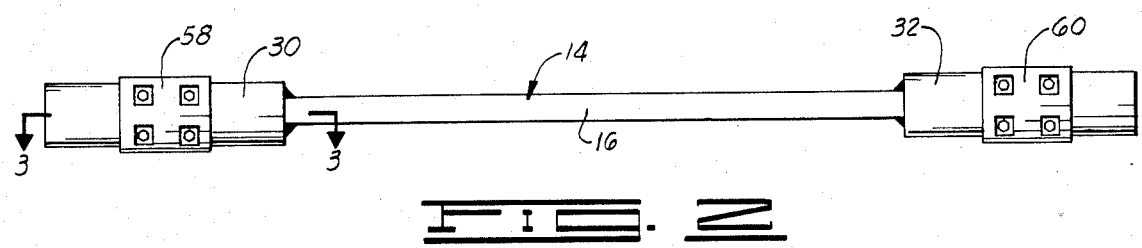
FIG. 2 is a front elevational view of the bumper shown in FIG. 1.

Referring now to the drawings in general and to FIGS. 1 and 2 in particular, shown therein and designated by the general reference numeral 10 is an improved bumper constructed in accordance with the present invention. It is contemplated that the bumper 10 will be welded to the frame of an automotive vehicle and portions of such frame, designated by the numeral 12, have been indicated in dot-dash line in FIG. 1 for purposes of discussing the construction and use of the bumper 10.

Figures 3, 4:
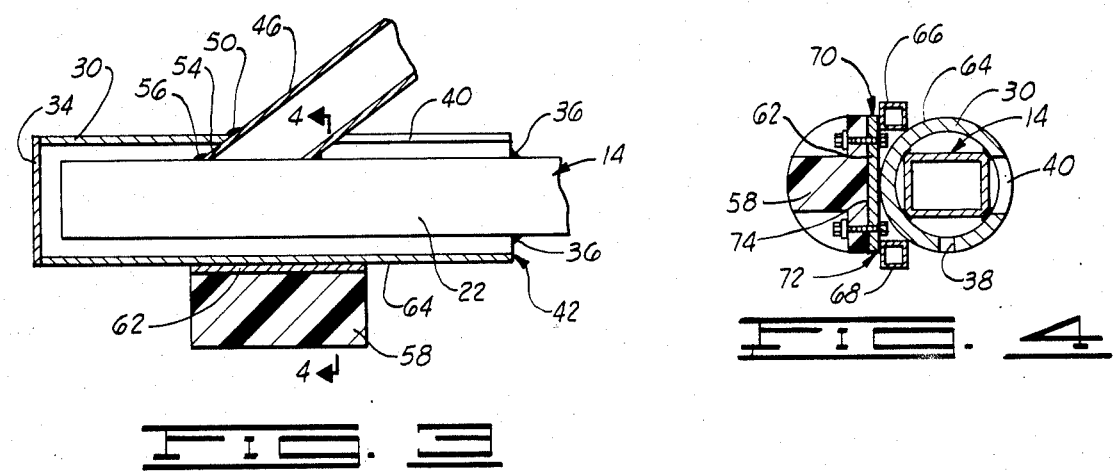
FIG. 3 is a cross section of one end portion of the bumper of FIGS. 1 and 2 taken along line 3—3 of FIG. 2.
FIG. 4 is a cross section and side elevation of an end portion of the bumper taken along line 4—4 of FIG. 3.

As shown in FIG. 1, the bumper 10 is comprised of a crossbar 14 that is preferably constructed of rectangular tubing, as indicated in FIG. 4, that extends laterally across one end of the frame 12 and to which the crossbar 14 can be conveniently welded. The crossbar 14 has a medial portion 16, that defines a medial portion of the bumper 10, and the medial portion 16 of the crossbar is conveniently butt welded to th ends of beams 18 and 20 of which the frame 12 is comprised. Extending laterally of opposite sides of the frame 12, the crossbar 14 is comprised of a first end portion 22 projecting laterally from the beam 18 and terminating in a first end 24 displaced laterally of the frame 12, and a second end portion 26 projecting laterally of the beam 20 and terminating in a second end 28 displaced laterally of the frame 12 so that the end portions 22 and 26 of the crossbar 14 extend laterally of the frame 12 at opposite sides of the frame 12.

The bumper 10 is further comprised of two circular tubular reinforcement sheaths 30 and 32, which can conveniently be lengths of drill pipe, mounted on the end portions 22 and 26 so that major portions of the end portions 22 and 26 of the crossbar 14 extend into the sheaths 30 and 32 respectively. The sheaths 30 and 32 thus extend circularly about the end portions 22 and 26 of the crossbar 14, with the cylindrical outer peripheries thereof centered on an axis extending axially of the medial portion 16 of the crossbar 14, to define end portions of the bumper 10. As shown in FIGS. 3 and 4, a plate 34 is welded to the distal end of the sheath 30 to provide the bumper 10 with pleasing esthetic qualities and, at the same time, eliminating a circular edge at the end of the bumper 10 at which the sheath 30 is disposed that might snag an obstruction should a vehicle utilizing the bumper 10 cross a medial strip between oppositely directed lanes of traffic of a freeway or highway. The sheath 30 can be conveniently mounted on the crossbar 14 via welds 36 at the corners of the crossbar 14 to rigidly secure the sheath 30 to the crossbar 14. As shown in FIG. 4, the sheath 30 can be provided with drainage ports 38 to prevent the collection of water within the sheath 30. The sheath 32 is similarly provided with an end plate (not shown) and drainage ports (not shown) and is welded about the second end portion 26 of the crossbar 14 in the same manner that the sheath 30 is welded about the first end portion 22 of the crossbar 14.

In the embodiment of the invention shown in FIGS. 1-4, a slot 40 is formed through the wall of the sheath 30 to intersect the end 42 of the sheath 30 and extend a selected distance through the wall of the sheath 30 toward the opposite end (not numerically designated in the drawings) thereof. The sheath 32 is similarly provided with a slot intersecting the end 44 thereof (FIG. 1) that faces the medial portion 16 of the crossbar 4.

The bumper 10 further comprises two braces 46 and 48 that are welded to the sheaths 30 and 32 respectively, as indicated at 50 and 52 in FIG. 1, and the braces 46 and 48 extend at an angle to the longitudinal axes of the sheaths 30 and 32 to converge toward the beams 18 and 20 respectively of the frame 12 so that the braces 46 and 48 can be welded to the frame 12 to support the end portions of the bumper 10 against pivoting movement about the connections of the crossbar 14 to the beams 18 and 20.

In the embodiment of the bumper shown in FIGS. 3 and 4, a portion 54 of the brace 46 extends through the slot 40 formed through the wall of the tubular sheath 30 and is welded, as at 56, to the first end portion 22 of the crossbar 14. The slot 40 thus permits the sheath 30 to be mounted on the end portion 22 of the crossbar 14 following the welding of the brace 46 between the crossbar 14 and the frame 12 and thus enables the bumper 10 to be constructed on a conventional vehicle bumper that has been modified by the addition of braces, such as the brace 46, to end portions of the bumper 10. That is, all that is necessary to construct the bumper 10 in such circumstance is to align the slot 40 with the brace 46, slide the sheath 30 along the end portion 22 of the crossbar 14 so that the brace 46 enters the slot 40 to the full depth thereof and then weld the sheath 30 to the brace 46 as has been noted above. The sheath 32 is similarly mounted on the end portion 26 of the crossbar 14, with a portion of the brace 48 extending through the slot in the sheath 32, and welded to the brace 48.

In order to provide some protection for vehicles that might collide with a vehicle upon which the bumper 10 is mounted, each of the sheaths 30 and 32 has mounted thereon an elastomeric pad, 58 for the sheath 30 and 60 for the sheath 32, positioned on the sheaths 30 and 32 in diametric opposition to the sides of the sheaths 30 and 32 from which the braces 46 and 48 extend. The construction of such pads and the mounting of the pads on the sheaths 30 and 32 has been particularly illustrated for the mounting of the pad 58 on the sheath 30 in FIGS. 3 and 4. As shown therein, a plate 62 is welded to the outer peripheral surface 64 of the sheath 30 to parallel the slot 40 and square tubes 66 and 68 are welded between the upper and lower edges, 70 and 72 respectively, of the plate 62 and the outer peripheral surface 64 of the sheath 30 to provide a rigidly supported, flat surface 74 against which the pad 58 can be abutted. The pad 58 is conventional and has a semicircular cross section as shown in FIG. 4 to abut with the surface 74 and holes are formed through portions of the pad 58 to receive bolts therethrough for connecting the pad 58 to the plate 62. Mating holes are formed through the plate 62 so that the pad 58 can be bolted to the plate 62 as indicated in FIGS. 1, 2 and 4.

DESCRIPTION OF FIGS. 5 AND 6

Figures 5, 6:
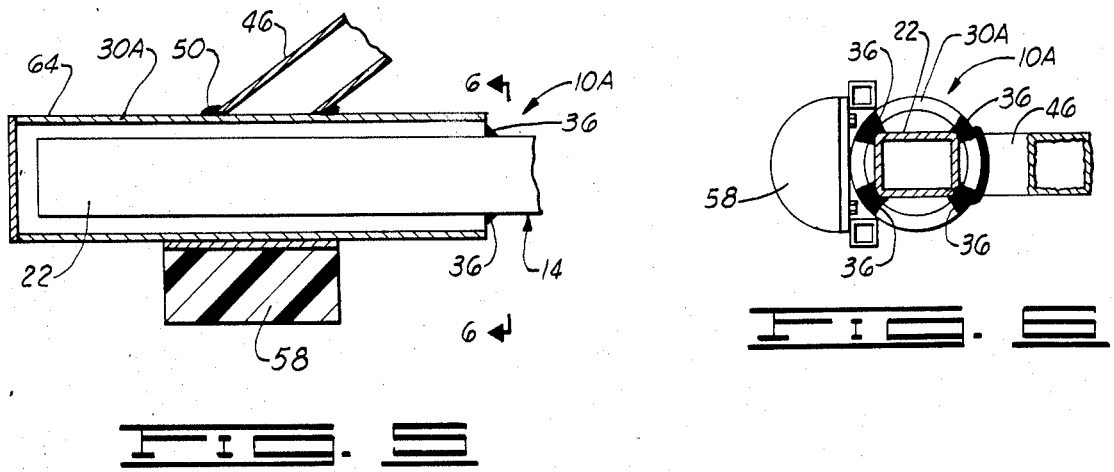
FIG. 5 is a cross section in plan view of a modified and portion of a bumper constructed in accordance with the present invention.
FIG. 6 is a cross section and elevation of the end portion of the modified bumper shown in FIG. 5 taken along line 6—6 of FIG. 5.

FIGS. 5 and 6 provide a fragmentary view of a modified form of the bumper, designated by the numeral 10A, of the present invention. Like the bumper 10, the bumper 10A is comprised of a crossbar 14 that can be welded to the frame 12 in the manner shown in FIG. 1 and has an end portion 22 that extends laterally from one side of the frame 12. However, the bumper 10A differs from the bumper 10 in the construction and mounting of the sheath, designated 30A in FIGS. 5 and 6, that extends circularly about the first end portion 22 of the crossbar 14. In particular, the sheath 30A differs from the sheath 30 in that the slot 40 of the sheath 30 is omitted in the sheath 30A. Correspondingly, the portion 54 of the brace 46 is omitted in the bumper 10A so that the brace 46 is butt welded to the outer peripheral surface 64 of the sheath 30A as indicated at 50 in FIG. 5. The bumper 10A is similarly comprised of a second sheath, extending circularly about the second end portion 26 of the crossbar 14, that is identical to the sheat 30A and is identically attached to the brace 48 on the side of the frame 12 opposite the side from which the sheath 30A extends. As in the case of the bumper 10, the bumper 10A is comprised of elastomeric pads (only one pad, designated 58, has been shown for the bumper 10A) that are mounted on the modified sheaths of the bumper 10A in the same manner that the pads 58 and 60 of the bumper 10 are mounted on the sheaths 30 and 32 of the bumper 10. The bumper 10A is conveniently constructed by sliding the sheath 30A over the first end portion 22 of the crossbar 14 and the corresponding sheath (not shown) over the second end portion 26 of the crossbar 14, welding the sheaths to the crossbar 14 as at 36 in FIGS. 5 and 6, and then welding the braces 46 and 48 to the outer peripheral surfaces 64 of the sheaths of the bumper 10A, as shown for the brace 46 and the sheath 30A in FIG. 5, and to the beams 18 and 20 of the frame 12.

It will be clear that the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved bumper for mounting on the frame of a vehicle, comprising:

a cross bar having a first end portion, a second end portion, and a medial portion between the first end portion and the second end portion, whereby the bumper can be mounted on the vehicle by attachment of the medial portion to the vehicle frame so that the end portions of the crossbar extend laterally from opposite sides of the frame;

two tubular reinforcement sheaths, each sheath mounted on one of the end portions of the crossbar to extend circularly thereabout, wherein a slot is formed through the wall of each sheath to intersect the end of the sheath facing the medial portion of the crossbar, said slot extending a selected distance longitudinally toward the opposite end of the sheath;

two braces, each brace attached to one of the sheaths and entending therefrom at an angle to the longitudinal axis of the sheath for attachment to the vehicle frame, and where portions of each brace are extended through said slot and attached to the end portion of the crossbar positioned within the sheath; and two elastomeric pads, each pad mounted on one of said sheaths on a side of the sheath diametrically opposed to the attachment of a brace to the sheath.

2. An improved bumper for mounting on the frame of a vehicle, comprising:

a crossbar having a first end portion, a second end portion, and a medial portion between the first end portion and the second end portion, whereby the bumper can be mounted on the vehicle by attachment of the medial portion to the vehicle frame so that the end portions of the crossbar extend laterally from opposite sides of the frame;

two tubular reinforcement sheaths, each sheath mounted on one of the end portions of the crossbar to extend circularly thereabout; and two braces, each brace attached to one of the sheaths and entending therefrom at an angle to the longitudinal axis of the sheath for attachment to the vehicle frame;

wherein a slot is formed through the wall of each sheath to intersect the end of the sheath facing the medial portion of the crossbar, said slot extending a selected distance longitudinally toward the opposite end of the sheath; and wherein portions of each brace are extended through said slot and attached to the end portion of the crossbar positioned within the sheath.

3. A reinforcing member for a bumper crossbar having a medial portion mountable on the frame of a vehicle and end portions laterally extendable from the vehicle frame at such times that the bumper cross bar is mounted on said frame, comprising:

a tubular sheath mountable on one of the end portions of the crossbar to extend circularly thereabout, wherein a slot is formed through the wall of said sheath to intersect one end of said sheath and extend axially therefrom a selected distance toward the opposite end of the sheath; and an elastomeric pad mounted on one side of said sheath.

* * * * *